US008725157B2

(12) United States Patent
Aqvist et al.

(10) Patent No.: US 8,725,157 B2
(45) Date of Patent: May 13, 2014

(54) INTERFERENCE AVOIDANCE IN A WCDMA SYSTEM

(75) Inventors: Hans Aqvist, Järfälla (SE); Farshid Ghasemzadeh, Sollentuna (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 868 days.

(21) Appl. No.: 12/602,453

(22) PCT Filed: May 31, 2007

(86) PCT No.: PCT/SE2007/050389
§ 371 (c)(1),
(2), (4) Date: Nov. 30, 2009

(87) PCT Pub. No.: WO2008/147268
PCT Pub. Date: Dec. 4, 2008

(65) Prior Publication Data
US 2010/0178921 A1 Jul. 15, 2010

(51) Int. Cl.
*H04W 36/00* (2009.01)

(52) U.S. Cl.
USPC ........ 455/443; 455/453; 455/436; 455/432.1; 455/418; 370/237; 370/328

(58) Field of Classification Search
USPC .......... 455/435.1, 63.1, 434, 435.2, 436–444, 455/450, 524, 525, 552.1, 418, 422.1, 455/432.1, 446, 453; 370/310, 320, 322, 370/324, 341, 342, 232, 237, 241, 370/328–338; 379/1.01–35
See application file for complete search history.

(56) References Cited

U.S. PATENT DOCUMENTS

| | | | |
|---|---|---|---|
| 6,553,230 B1* | 4/2003 | Plestid et al. | 455/436 |
| 6,744,747 B2* | 6/2004 | Shiu et al. | 370/331 |
| 6,801,772 B1* | 10/2004 | Townend et al. | 455/436 |
| 7,835,740 B2* | 11/2010 | Claussen et al. | 455/435.1 |
| 7,890,099 B2* | 2/2011 | Mohammed | 455/432.1 |
| 7,933,598 B1* | 4/2011 | Agrawal et al. | 455/436 |
| 2002/0105927 A1* | 8/2002 | Holma et al. | 370/331 |
| 2002/0151304 A1* | 10/2002 | Hogan | 455/436 |
| 2004/0152480 A1* | 8/2004 | Willars et al. | 455/513 |
| 2005/0009531 A1* | 1/2005 | Lindquist et al. | 455/452.2 |
| 2006/0111108 A1* | 5/2006 | Newbury et al. | 455/436 |

(Continued)

FOREIGN PATENT DOCUMENTS

| | | | |
|---|---|---|---|
| JP | 2005-086374 A | | 3/2005 |
| WO | WO 03/094544 | * | 4/2003 |
| WO | WO 03094544 A1 | | 11/2003 |
| WO | WO 2005101890 A1 | | 10/2005 |

*Primary Examiner* — Quan M Hua

(57) ABSTRACT

A method for a cellular system comprising base stations of a first and a second kind, which control cells of a first and second kinds, and a control function for the base station of the first kind. The control function maintains a list of cells in the vicinity of the first cell, a Neighbor Cell list, and a UE in the first cell measures transmissions from Neighbor Cells and reports them, and said UE makes Detected Set, DS, measurements, and reports them to the control function. The control function searches DS measurement reports for cells of the second kind, and if a cell of the second kind is found, a hand over of the UE is initiated, to prevent transmissions from the UE to cause interference in the base station of the second kind.

8 Claims, 3 Drawing Sheets

(56) References Cited

U.S. PATENT DOCUMENTS

| | | |
|---|---|---|
| 2007/0105527 A1 | 5/2007 | Nylander et al. |
| 2007/0207822 A1* | 9/2007 | Andersson et al. ........... 455/502 |
| 2007/0254620 A1* | 11/2007 | Lindqvist et al. ............ 455/403 |
| 2008/0101301 A1* | 5/2008 | Thomas et al. ............... 370/335 |

* cited by examiner

INTERFERENCE AVOIDANCE IN A WCDMA SYSTEM

TECHNICAL FIELD

The present invention discloses a method and a device for avoiding inter cell interference in a cellular system such as the WCDMA system, in which system there are both small cells, so called Femto cells, and "ordinary" cells, so called Macro cells.

BACKGROUND

In a wireless cellular telephony system of the WCDMA kind, only one or a few frequencies are used by the system, which is made possible by the fact that the transmissions in the different cells of the system are made using different so called scrambling codes.

The fact that only one or a few frequencies are used in a WCDMA system may cause a problem when deploying so called Femto Base Stations, which are at present being developed in order to provide wireless cellular telephony coverage for end users in limited coverage areas, so called Femto cells, such as, for example, private homes or offices.

A Femto Base Station will more or less be designed as an "ordinary" base station of the system within which it is intended for deployment, i.e. in this case a WCDMA system. However, a major difference between Femto Base Stations and the "ordinary" or "Macro" base stations of the WCDMA system in which the Femto Base Station is deployed is the output power of the Femto Base Station, and thus the area which can be covered by means of the cell which is served by the Femto Base Station, the Femto cell. The output power of the Femto Base Station will be significantly much smaller than the output power of the Macro base stations, and will thus limit the size of a Femto cell compared to the area of the Macro cells.

The problem referred to above which may arise when using Femto cells interspersed with the larger Macro cells in a WCDMA system is caused by the fact that both the Macro cells and the Femto cells may be deployed on one and the same frequency. Thus, user terminals, UEs, in the Macro cells may interfere with the Femto cells when transmitting to the Macro base stations, i.e. so called Up Link, UL, transmissions.

If a Macro UE is close to a Femto base station, its UL transmissions, which may be made using a high output power level, may cause interference in the Femto base station.

A WCDMA system comprises a control function for Base Stations, known as the Radio Network Controller, the RNC. There is a function in the RNC in a WCDMA system by means of which the RNC keeps track of cells in the vicinity of a cell which it controls, the so called Neighbour list. The RNC also controls certain functions of the UEs in a cell, which is done via the Base Station of the cell.

Potentially, the Neighbour list could be used by an RNC in order to minimize UL interference from UEs to nearby Femto Base Stations. However, it is envisioned that large amounts of Femto cells may be deployed in a WCDMA network. If many Femto cells are deployed, it will not be possible to define all of them as neighbours to surrounding Macro cells, since the number of cells in a Neighbour list may be limited and, in addition, even if that were possible, the work involved in keeping such lists updated would be prohibitive.

Also, the problem described above is underlined by the fact that Femto base stations may be equipped with some kind of access control, since they are intended for use in private home or small offices. This means that it will not be possible for UEs of WCDMA cells in their vicinity to connect to them by means of functions in WCDMA known as soft or softer Hand Over, functions which otherwise might control transmissions of Macro UEs in the vicinity of Femto base stations so that interference problems would not arise.

SUMMARY

Hence, as shown above, there is a need to reduce or eliminate the risk of UL transmissions from Macro Cell UEs causing interference in Femto Base Stations.

This need is addressed by the present invention in that it discloses a method for use in a wireless cellular telephony system which comprises a first base station of a first kind, such as a Macro Base Station, and a second base station of a second kind, such as a Femto Base Station.

The two base stations mentioned above control a cell of a first and a second kind respectively, each cell being able to accommodate a number of user terminals, UEs. The cells of the first and second kinds have a respective coverage which at least partially coincide with each other, and the system also comprises a control function for the base station of the first kind.

The method of the invention comprises:
letting the control function maintain a list of cells which are in the vicinity of the first cell, a Neighbour Cell list,
letting a UE in the first cell measure transmissions from Neighbour Cells and report them to the control function,
letting the UE also detect transmissions from cells which are not Neighbour cells of the first cell, so called Detected Set, DS, measurements, and report them to the control function.

In addition, the method of the invention comprises:
letting the control function search DS measurement reports to identify cells of the second kind,
if a cell of the second kind is found in a DS measurement report, the control function initiates a hand over of the reporting UE, in order to prevent transmissions from the reporting UE to cause interference in the base station of the second kind.

Thus, by means of the present invention, interference in Femto cells caused by UL transmissions from Macro UEs can be reduced or eliminated, since a Macro UE which is detected to be within the coverage of a Femto Base Station can be subjected to a Hand Over.

This and other advantages of the present invention will become more apparent from the following detailed description.

The invention also discloses a node for use as a control function for a Macro Base Station in a WCDMA system.

BRIEF DESCRIPTION OF THE DRAWINGS

The invention will be described in more detail in the following, with reference to the appended drawings, in which.

DETAILED DESCRIPTION

Figure 1:
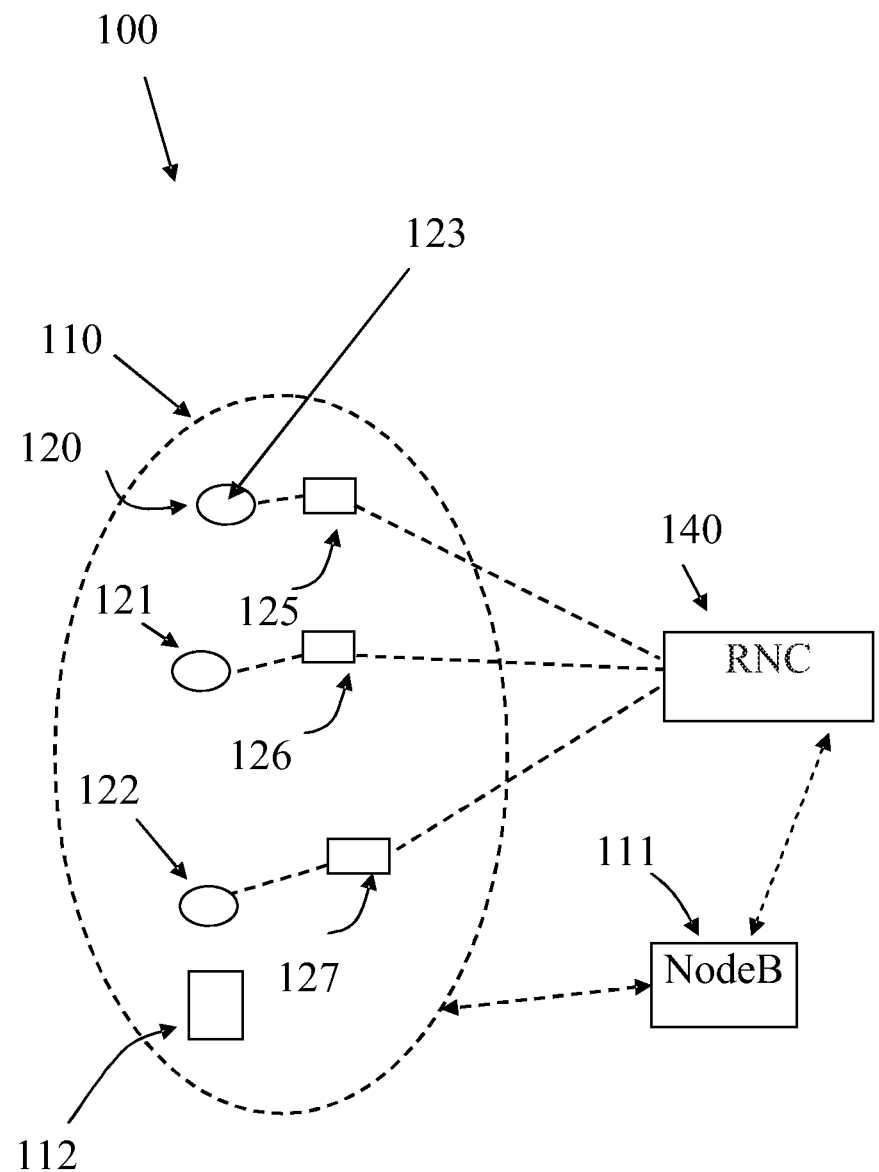
FIG. 1 shows an overview of a system in which the invention may be applied.

FIG. 1 shows an example of a part of a system 100 in which the invention may be used. Before the invention and in particular FIG. 1 are explained further, it should be pointed out that although the invention is primarily intended for a WCDMA system, the invention it is not limited to such an application. Thus, in the text below, some terms which are generic to cellular telephony will sometimes be used instead of WCDMA specific terms.

One example of such a generic term is the term "base station", a term which is used to denote a function which controls the traffic to and from a cell in the system. In some systems, the function is known as Radio Base Station, RBS, and in WCDMA systems, the term used is usually Node B. In other systems, the term Base Transceiver stations, BTS, or eNodeB is used. Hence, the term "base station" is intended as a generic term intended to cover all such functions or nodes in cellular systems.

The system 100 comprises a number of base stations 125-127 of a second kind, so called Femto Base Stations, which are base stations with essentially the same functions as "normal" or Macro base stations, but with a significantly much smaller cell, i.e. the Femto cell, than a Macro cell.

As an example, a Femto cell could have an area which is 1000 times smaller than a Macro cell, or even less. The cells which are controlled by the Femto Base Stations 125-127, i.e. the Femto cells, are shown as 120-122 in FIG. 1. As shown in FIG. 1, the system 100 may also comprise a function 140 for controlling the Femto Base Stations, a so called Radio Network Controller, RNC 140. The role of the RNC as such is well known to those skilled in the art, and will thus not be described in more detail here.

In each of the Femto cells of the Femto Bases 120-122 in FIG. 1, there can be a first number of users with user terminals, UEs, one of which is shown as 123 in the cell 120.

Also shown in FIG. 1 is a Macro cell 110, inside which the Femto Bases 125-127 with their cells 120-122 are located. This is merely an example, it is possible for a Femto cell to have a coverage which only has a partial overlap with a Macro Cell. The Macro cell 110 can comprise a number of users with user terminals, UEs, one of which is shown as 112 in FIG. 1. The traffic to and from UEs in the Macro Cell 110 is controlled by a Macro Radio Base Station, RBS, shown as 111 in FIG. 1. The Macro Base Station will also be referred to as the "NodeB" below.

The NodeB 111 is in turn controlled by an RNC, which can be the same RNC 140 as the one controlling the Femto Base Stations, which is indicated in FIG. 1, or the RNC of the NodeB 111 can be another RNC.

As explained previously in this text, one of the problems intended to be addressed by the present invention is the fact that Up Link, UL, transmission from the UEs 112 in the Macro cell 110 may cause interference in the Femto Base Stations 125-127, since these transmission may be made with a high level of output power, particularly when compared to the output power levels used in a Femto cell.

As will be explained in more detail below, the invention comprises the concept of letting the RNC of the Macro cell 110 detect if a UE in the Macro cell 110 has come within "hearing range" (radio detection) of one of the Femto base stations 125-127, and if so, the RNC of the NodeB initiates a Hand Over of the UE in question, so that the UL transmissions of the UE will not be received by the Femto cell in question.

The Hand Over can be of different kinds: since the reason for the Hand Over is to avoid interference by UE UL transmissions, the Hand Over can be a so called Inter Frequency Hand Over, IFHO.

In the case of an IFHO, the UE is handed over to another operating frequency, but may still be handled by the same NodeB, or by another NodeB on the new frequency. Thus, in the case of an IFHO, the UE still operates in a WCDMA system, but on another frequency.

The Hand Over may also be a so called Inter Radio Access Technology Hand Over, IRAT HO. In the case of an IRAT HO, the UE is handed over to another system, i.e. it will operate in a wireless cellular telephony system of another standard, such as, for example, the GSM system or an LTE system. The Base Station to which the Hand Over is made can still be the same Base Station, if it is equipped to operate according to the new standard, or it can be another Base Station which has the proper equipment.

It can be mentioned that IRAT HO may be used in systems which only comprise Macro cells, if a UE of a WCDMA system moves into an area where there is little or no WCDMA coverage, but where there is, for example, GSM coverage.

In the following, reference may be made to a UE which listens for "other cells", or which is "in communication with other cells", or "detects transmissions from other cells", etc. These phrases may be used as alternatives to saying that the UE listens to transmissions from a NodeB of another cell, is in communication with a NodeB of another cell, or that it detects transmissions from NodeBs of other cells, etc.

An RNC of the system 100 has, for each cell of a NodeB that it controls, a list of cells which are in the vicinity of that cell, the Neighbour cell list. The Neighbour cell list includes a number of parameters for each cell in the list, such as, for example the cell ID and the cell's scrambling code. In the WCDMA system, the Neighbour List, with the scrambling code and possibly also the output power level of the cells in the list, can be sent by the RNC to a UE, and a UE may be requested by its controlling RNC to listen for transmissions from cells in the Neighbour list, and to report detected transmissions from other cells to the RNC, which is done via the NodeB.

However, a problem arises if a UE reports that it has detected NodeB transmissions from a cell which is not in the Neighbour list which the UE has received from its RNC. If such a cell/NodeB is detected by a UE and reported to the RNC of the UE's cell, then the detected cell cannot be included in the UE's AS. Such cells, i.e. cells which are not in the UE's neighbour cell lists can still be detected by the UE, for example by means of a function known in the 3GPP as detected set, DS, measurements. The DS function is a function by means of which a UE attempts to detect all transmissions on a certain frequency, suitably the one used by the NodeBs in the UE's AS, regardless of whether or not they are included in the UE's neighbour cell list. When a UE detects a transmission in a DS measurement, it will send a measurement report comprising the scrambling code or codes detected in the DS measurement to the RNC of the UE.

In brief, and as will be explained in more detail in the following, by means of the present invention, an RNC which receives a DS measurement report will be able to use the contents of the report to see if a cell which has been detected during a DS measurement is a Femto cell. The check to see if the detected cell is a Femto cell will, in a preferred embodiment, take place in real time, or as near real time as possible, and if the cell turns out to be Femto cell, the Hand Over mentioned previously will be initiated.

Turning now to how an RNC may, according to the invention, carry out its check of a DS measurement report in order to see if any of the cells in the report may be Femto cells, this may be done in the following manner: A number of scrambling codes can be reserved by the system for use by Femto cells only. The RNC maintains a list of these codes, and when the RNC receives a DS report, it can check to see if any of the scrambling codes in the DS report is a code which is one of those that are reserved for Femto cells.

If/when a DS report from a UE has been identified as comprising a scrambling code from a Femto cell, then a Hand Over, a HO, either an IFHO or an IRAT HO can be initiated for the UE in question.

As an alternative to the RNC maintaining a list of the reserved scrambling codes, various interactive scenarios are possible, such as the RNC forwarding the DS reports to a node which carries out the search, in which case the RNC would simply receive a result of the search, such as "Femto"/"No Femto", or "Initiate HO"/"Don't initiate HO". As another alternative, the RNC can receive the list of reserved scrambling codes from a node which keeps the list. Other options are also possible, as will be apparent to those skilled in the art.

Figure 2:
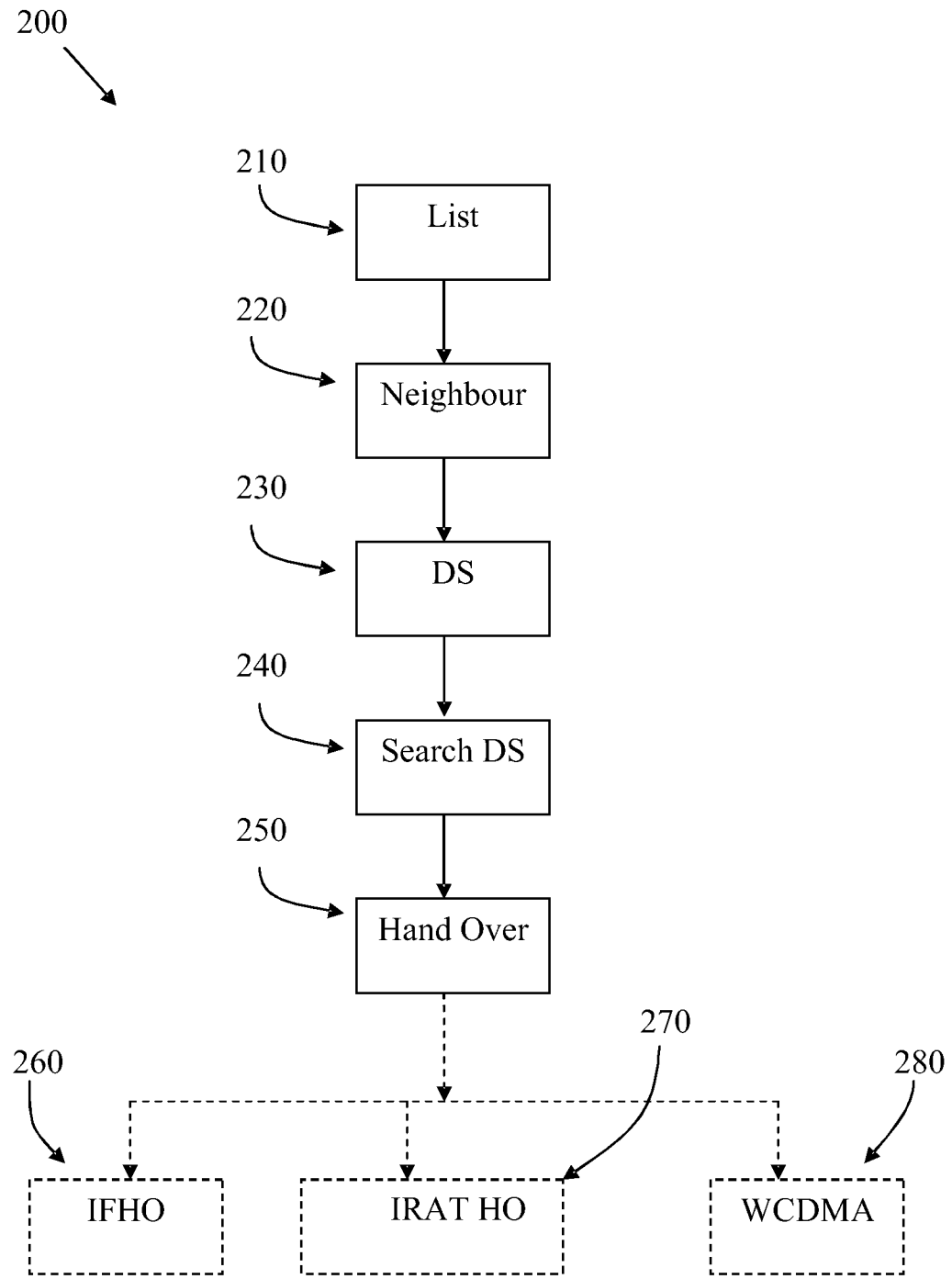
FIG. 2 shows a flow chart of a method of the invention.

FIG. 2 shows a schematic flow chart of a method 200 of the invention. Steps which are options or alternatives have been shown with dashed lines.

As has emerged from the description above, the method is intended for use in a wireless cellular telephony system such as a WCDMA system. The system in which the invention is applied will comprise base station of a first and a second kind, e.g. Macro Base Stations and Femto Base Stations, which controls respective cells of a first and a second kind, i.e. Macro and Femto cells in this example. The coverages of the two cells should at least partially coincide with each other, and the system will comprise a control function for the Base Stations of the first kind, e.g. an RNC if the invention is used in a WCDMA system As indicated in step 210 of FIG. 2, the method 200 comprises letting the control function, e.g. the RNC, maintain a list of cells which are in the vicinity of the first cell, a Neighbour Cell list.

Step 220 shows that the method 200 comprises letting a UE in a cell of the first kind, i.e. in this case in a Macro cell, measure transmissions from Neighbour Cells and report them to the control function.

Also shown is step 230, which comprises letting the measuring UE detect transmissions from cells which are not Neighbour cells of its cell, so called Detected Set, DS, measurements, which are reported to the control function.

In addition, the method comprises, as shown in step 240, letting the control function search the DS measurement reports in order to identify cells of the second kind, and, step 250, if a cell of the second kind (e.g. Femto) is found in a DS measurement report, the control function will initiate a hand over of the reporting UE, so that transmissions from the reporting UE are prevented from causing interference in the base station or stations of the second kind, the Femto Base Stations.

As indicated in step 260, the Hand Over can be an IFHO, as an alternative to which it can be an IRAT HO, as indicated in step 270. Step 280 is used to indicate that the invention is suitably applied to a WCDMA system, although other systems, such as LTE systems, are also possible application areas for the present invention.

Figure 3:
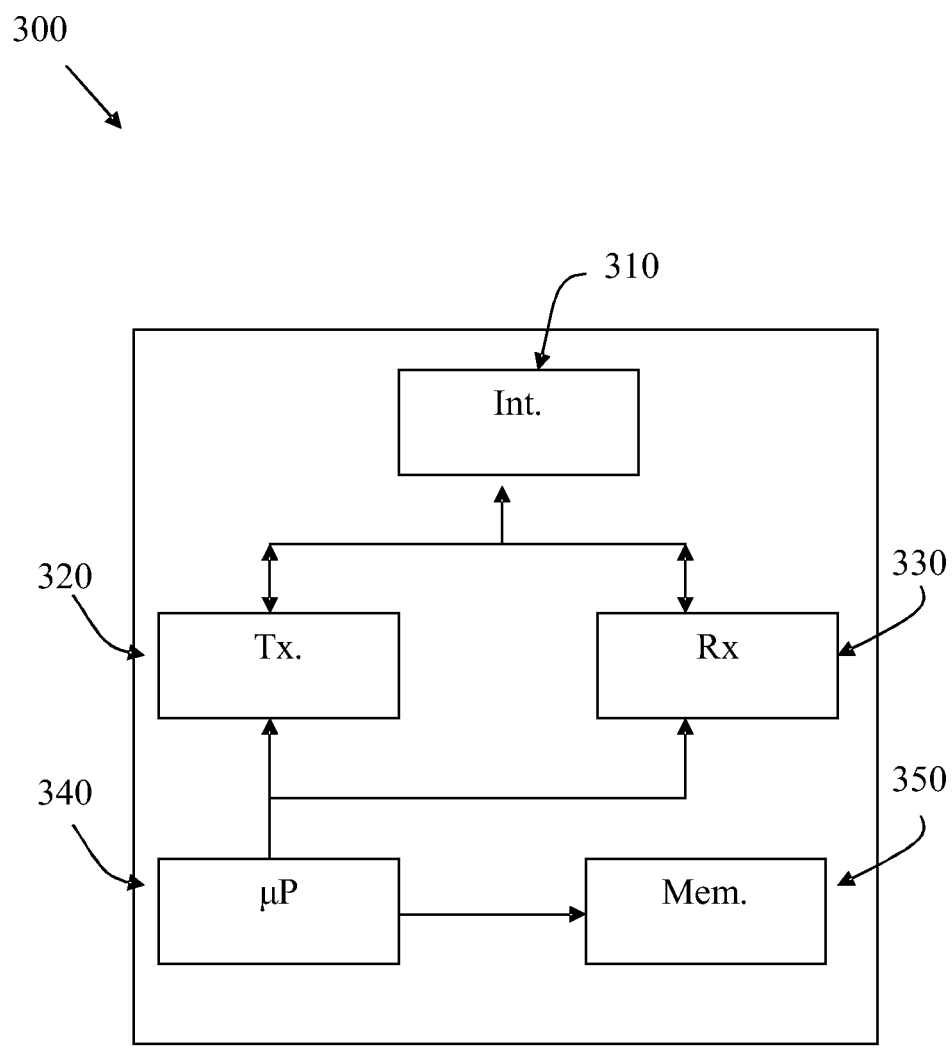
FIG. 3 shows a block diagram of a control function of the invention.

FIG. 3 shows a schematic block diagram of a controlling node 300 of the invention, such as an RNC. As indicated in FIG. 3, the RNC 300 of the invention comprises an interface 310, which is used both for transmission and reception of traffic to/from the NodeBs, and via them the UEs. It is possible for the RNC 300 of the invention to be in contact with the NodeBs and/or UEs which it controls via, for example, the Internet or some other such network, in which case the interface 310 will serve as the interface towards that network.

The RNC of the invention will also comprise a transmit function 320 and a receive function 330, as well as a control and calculation function, suitably a microprocessor 340 as shown in FIG. 3, and the RNC 300 also comprises memory means, 350.

The Memory means 350 will serve to maintain the Neighbour Cell list, which has been explained above, in which it may be aided by the processor 340.

The interface 310 and the receive part 330 can be used to communicate with a UE via a NodeB, i.e. to receive reports from a UE regarding detected transmissions by UEs from Neighbour Cells, and also for receiving reports from said UE regarding transmissions from cells which are not Neighbour cells of the first cell, i.e. the Detected Set measurements. The processor 340, and possibly also the memory means 350, can serve to search DS reports in order to identify Femto cells.

The processor 340, together with the transmit part 320 and the interface 310 can be used for initiating a hand over of the reporting UE, if a Femto cell is found in a DS measurement report.

Finally, it should be mentioned that the measurements carried out by the UE, i.e. the measurements of Neighbour cells and Detected Set cells can be carried out independently by the UE, or they can be ordered from the RNC, as has been mentioned above. In the latter case, the processor 340 may keep track of when the measurements should be carried out, and the interface 310 and the transmit part 320 are used to transmit the commands for measurements to the UE, suitably via the NodeB.

This proposed functionality can improve system performance and reduce the UL interference in the small cells, thus making it more attractive to mix small and large WCDMA cells on the same frequency. However, the invention can be used in other systems where the same problems are encountered, and should thud not be seen as being restricted o WCDMA systems.

The invention is not limited to the examples of embodiments described above and shown in the drawings, but may be freely varied within the scope of the appended claims.

The invention claimed is:

1. For use in a wireless cellular telephony system including a first base station operable in a macro cell and a second base station operable in a femto cell, said macro cell being different than said femto cell and having respective coverages that at least partially coincide, a method of operating a base station controlling node of said wireless cellular telephony system, the method comprising:

maintaining a neighbour cell list of neighbour cells in a vicinity of said first base station and a reserved list of scramble codes reserved for one or more femto base stations;

receiving a measurement report from a mobile user equipment currently associated with the first base station for transmissions between said mobile user equipment and said neighbor cells;

receiving further a detected set measurement report from said mobile user equipment for transmissions between said mobile user equipment and cells that are not indicated in said neighbour list;

upon receiving the detected set measurement report, identifying said femto cell by comparing the scramble codes in said detected set measurement report against the reserved list; and in response to only determining that the detected set measurement report has at least one scramble code that matches the reserved list, initiating a hand over of said mobile user equipment to another operating frequency or a wireless cellular telephony system of another standard operated by said first base station to prevent transmissions from said mobile user equipment to cause interference with said second base station identified in said detected set measurement report.

2. The method of claim 1 further comprising ordering said user equipment to provide said measurement report and said detected set measurement report.

3. The method of claim 1 wherein said controlling node is a radio network controller in a WCDMA wireless cellular telephony system.

4. For use in a wireless cellular telephony system including a first base station operable in a macro cell and a second base station operable in a femto cell, said macro cell being different than said femto cell and having respective coverages that at least partially coincide, a controlling node of said wireless cellular telephony system, the controlling node comprising:
   a processor; and
   memory including computer program code, said memory and said computer program code configured to, with said processor, cause said controlling node to perform at least the following:
      maintain a neighbour cell list of neighbour cells in a vicinity of said first base station and a reserved list of scramble codes reserved for one or more femto base stations;
      receive a measurement report from a mobile user equipment currently associated with the first base station for transmissions between said mobile user equipment and said neighbor cells;
      receive further a detected set measurement report from said mobile user equipment for transmissions between said mobile user equipment and cells that are not indicated in said neighbor list;
      upon receiving the detected set measurement report, identify said femto cell by comparing the scramble codes in said detected set measurement report against the reserved list; and
      in response to only determining that the detected set measurement report has at least one scramble code that matches the reserved list, initiate a hand over of said mobile user equipment to another operating frequency or a wireless cellular telephony system of another standard operated by said first base station to prevent transmissions from said mobile user equipment to cause interference with said second base station identified in said detected set measurement report.

5. The controlling node of claim 4 wherein said memory and said computer program code are further configured to, with said processor, cause said controlling node to order said user equipment to provide said measurement report and said detected set measurement report.

6. The controlling node of claim 4 wherein said controlling node is a radio network controller in a WCDMA wireless cellular telephony system.

7. A wireless cellular telephony system, comprising:
   a first base station operable in a macro cell;
   a second base station operable in a femto cell, said first cell being different than said femto cell and having respective coverages that at least partially coincide; and
   a controlling node of said wireless cellular telephony system configured to:
      maintain a neighbour cell list of neighbour cells in a vicinity of said first base station and a reserved list of scramble codes reserved for one or more femto base stations;
      receive a measurement report from a mobile user equipment currently associated with the first base station for transmissions between said mobile user equipment and said neighbor cells;
      receive further a detected set measurement report from said mobile user equipment for transmissions between said mobile user equipment and cells that are not indicated in said neighbor list;
      upon receiving the detected set measurement report, identify said femto by comparing the scramble codes in said detected set measurement report against the reserved list; and
      in response to only determining that the detected set measurement report has at least one scramble code that matches the reserved list, initiate a hand over of said mobile user equipment to another operating frequency or a wireless cellular telephony system of another standard operated by said first base station to prevent transmissions from said mobile user equipment to cause interference with said second base station identified in said detected set measurement report.

8. The wireless cellular telephony system of claim 7 wherein said controlling node is further configured to order said user equipment to provide said measurement report and said detected set measurement report.

* * * * *